United States Patent [19]

Madigan

[11] 3,826,109
[45] July 30, 1974

[54] CAM POSITIONED DRIVE CONNECTOR FOR ROTOR

[75] Inventor: Basil M. Madigan, Wadsworth, Ohio

[73] Assignee: The Goodyear Tire & Rubber Company, Akron, Ohio

[22] Filed: July 25, 1972

[21] Appl. No.: 274,854

[52] U.S. Cl. .................. 64/27 R, 64/15 R, 64/31, 64/11
[51] Int. Cl. ............................................. F16d 3/14
[58] Field of Search...... 64/31, 27 R, 6, 27 C, 15 R, 64/11 R; 287/53 R

[56] References Cited
UNITED STATES PATENTS

| | | | |
|---|---|---|---|
| 1,658,786 | 2/1928 | Ellis et al. | 64/15 R |
| 2,793,513 | 5/1957 | Anderson | 64/15 R |
| 2,814,187 | 11/1957 | Babaian | 64/15 R |
| 3,036,445 | 5/1962 | Hein | 64/11 R |

FOREIGN PATENTS OR APPLICATIONS 1,278,003   10/1961   France .................................. 64/31

Primary Examiner—Samuel Scott
Assistant Examiner—Randall Heald
Attorney, Agent, or Firm—Oldham & Oldham

[57] ABSTRACT

The invention provides an improved drive connector particularly adapted for a wheel speed transducer which is automatically cam positioned, and which eliminates the problem of binding and misalignment of the driven shaft or rotor. Further, the system is less expensive than the former bellows type approach, as well as being better at eliminating bearing loads.

7 Claims, 5 Drawing Figures

PATENTED JUL 30 1974 3,826,109

CAM POSITIONED DRIVE CONNECTOR FOR ROTOR

Heretofore, it has been known that the problems of driving a wheel speed transducer through the rotation of the wheel have been difficult with respect to achieving the driving engagement, and have caused bearing problems in the rotor because of misalignment and binding problems between the drive and the rotor. The use of bellows or flexible attachments, besides being very expensive installations, have not really eliminated these problems. Further, all of these prior art systems and bellows type arrangements have a difficult problem of achieving correct alignment of the hub cap with the drive to the wheel speed transducer upon installation, as they normally do not automatically align.

Therefore, it is the general object of the present invention to avoid the shortcomings and difficulties of these prior art practices by the provisions of a cam positioned drive connector for a wheel speed transducer or rotor which is automatic in operation, highly reliable, and substantially eliminates any misalignment or bearing loading problems.

A further object of the invention is to provide the drive connector for automatic alignment through a unique cam arrangement associated with the drive bar of the rotor.

A further object of the invention is to provide a unique drive pin to drive bar arrangement which allows for controlled radial and axial relative movement therebetween without backlash, and to eliminate misalignment effects.

The aforesaid objects of the invention and other objects which will become apparent as the description proceeds are achieved by a cam positioned drive connector between a rotating body and a rotor comprising a cap removably mounted to the rotating body, a drive pin carried by the cap so as to be radially spaced from the center of rotation of the rotating body, and a drive bar connected to the rotor and adapted to cooperate with the drive pin which is characterized by cam means carried by the cap to guide the drive bar into cooperative relation with the pin when the cap is positioned onto the rotating body, and means to hold the pin in a biased firmly engaged relationship without backlash to the drive bar, while allowing for controlled axial and radial movement between the pin and the drive bar.

For a better understanding of the invention reference should be made to the accompanying drawings wherein.

Figure 1:
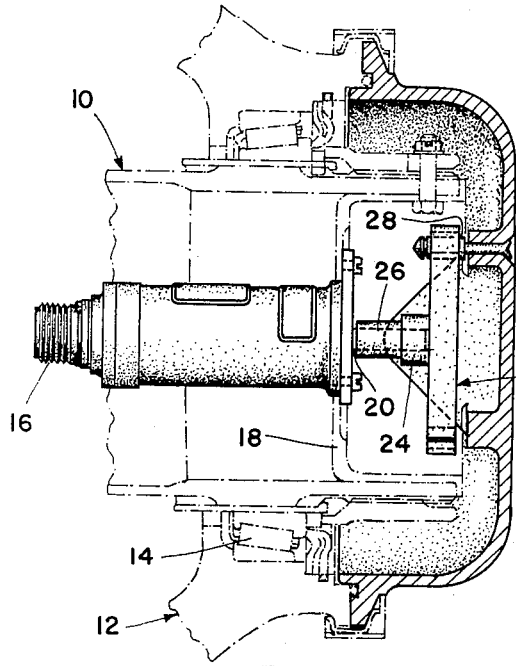
FIG. 1 is an enlarged broken away side elevation of the improved cam positioned drive connector of the invention as associated with a wheel speed transducer.

Now with reference to the embodiment of the invention illustrated in FIG. 1 of the drawings, the numeral 10 indicates a fixed axle upon which a wheel 12 is rotatably mounted by appropriate ball bearings 14, all in the usual way. For use in an anti-skid system for aircraft, as an example, a wheel speed transducer 16 is centrally mounted within the hollow axle 10 by being appropriately bolted to a center flange 18. The transducer 16 has a rotatable rotor inside the housing, which is rotatably driven by a driveshaft 20.

The invention is primarily designed to provide rotation of a driveshaft 20 upon rotation of the wheel 12 without placing any undue side loading or misalignment problems on the shaft 20 which are hence reflected in bearing wear and failure within the transducer assembly 16. To this end, a drive bar indicated generally by numeral 22 is mounted over the shaft 20 so that the bar 22 is substantially perpendicular thereto with its mounting shaft 24 extending over the driveshaft 20 and being locked into position by an appropriate pin 26. The drive bar 22 is then effectively driven upon rotation of the wheel 12 by a drive pin indicated generally by numeral 28 effectively cooperating in engagement therewith, which pin 28 is affixedly mounted to hub cap 30 which cap 30 in turn is mounted to the wheel 12. The details of the invention reside in the interrelationship between the drive pin 28 and drive bar 22, and will be explained in more detail hereinafter.

Figure 2:
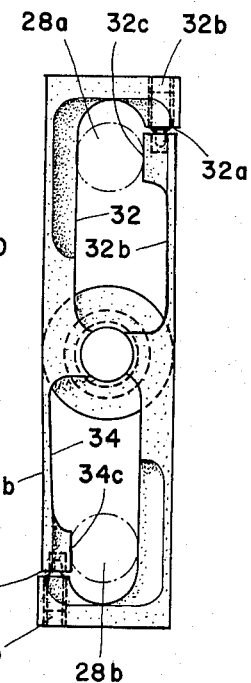
FIG. 2 is a plan view of the drive bar.
Figure 3:
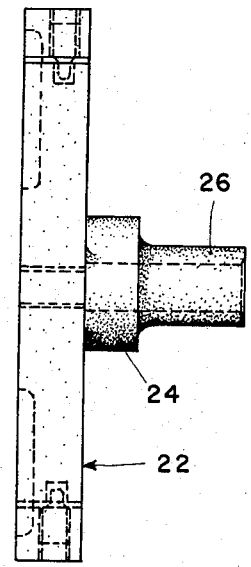
FIG. 3 is a side elevational view of the drive bar of FIG. 2.

With respect to FIGS. 2 and 3, the exact construction of the drive bar is indicated in great detail. It can be seen that the bar 22 has a pair of opposite extending longitudinal slots 32 and 34 which are interrupted or broken adjacent one edge near the ends thereof at 32a and 34a, respectively. This allows the respective sides or tangs 32b and 34b to, in effect, become spring loaded and create a spring bias effect on the raised surfaces 32c and 34c respectively. The drive pin 28 will normally ride in the position indicated by the chain dotted line 28a or 28b as associated with either of the slots 32 or 34.

The spring bias achieved by the tang sides 32b and 34b is further enhanced by actually effecting an inward set of the respective arms by a certain predetermined amount. In the example illustrated, with about a five inch diameter bore in axle 10, and with the drive bar 22 having a length of about 4 inches, and pin 28 having a diameter of approximately 0.440 inches, the tangs or sides 32b and 34b will be preset inwardly about 0.030 inches so that the normal spacing of the slot between the riding surfaces 32c and 34c will be approximately 0.410 to 0.430 inches which positively insures that a biased relationship will engage the pin to the slot.

In order to prevent the tangs 32b or 34b from being permanently biased outwardly past their elastic limit and thus causing the drive bar to lose the spring biased engaging relationship with the drive pin, limiting set screws 32d and 34d are provided as clearly shown in FIGS. 2 and 3 which have play in the tang portion to allow between .030 to 0.075 inches play in the tang before the set screw limits the movement, and which insures that the tangs will not be bent beyond their elastic limit and permanently deformed.

Hence, it should be seen with the spring biased tang arrangement of the drive bar, regardless of which slot the drive pin engages, the pin will be held in a spring biased relationship to the drive bar. It should be understood however that this relationship will allow a radial movement of the pin with respect to the drive bar, while still maintaining the spring biased relationship which insures the elimination of backlash problems. This relationship eliminates any undesirable torque or unbalance caused by radial misalignment to be transmitted to the drive shaft 20 of the transducer 16 through the drive bar 22.

Figure 4:
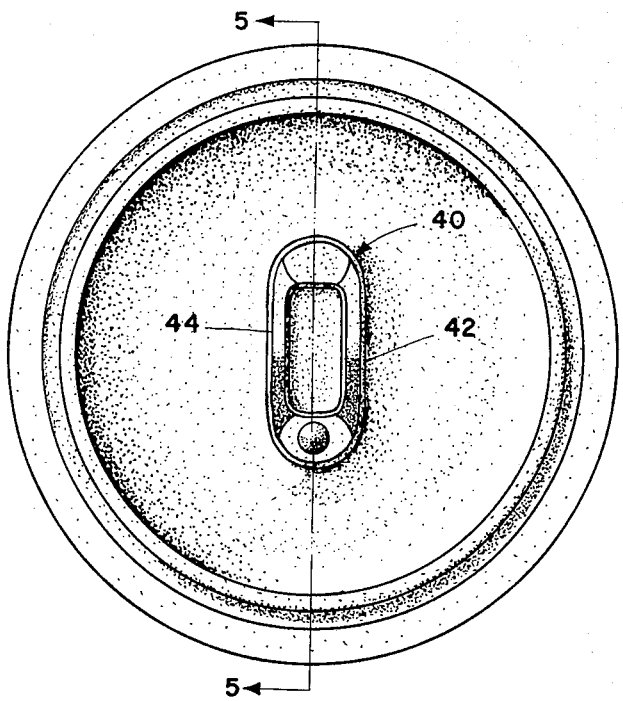
FIG. 4 is a plan view of the cam associated with the hub cap.
Figure 5:
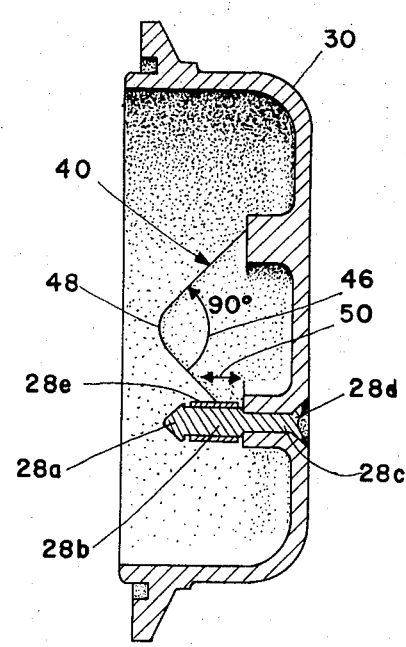
FIG. 5 is a side elevational view in cross-section of the cam and cap taken on line 5—5 of FIG. 4.

Now, in order to understand the cam means to achieve the automatic engagement of the drive pin 28 with one or the other of the slots in the drive bar 22, reference should be made to FIGS. 4 and 5. Here, it is seen that the cap 30 mounts a cam indicated generally by numeral 40 centrally thereof. The cam 40 takes the form of a pair of parallel open U-shaped members 42 and 44 spaced apart slightly greater than the width of the drive bar, with the open U of each member being best seen in FIG. 5. In essence, the inclined sides of each member defining the open U are at approximately right angled relationship to each other, as indicated by the angular arrow 46 in FIG. 5. The gradual curved relationship at the bottom of the open U between the sides at 48 is necessary to allow the cam 40 to effectively engage the drive pin 28 at any position and cause it to rotate around into alignment between the parallel sides 42 and 44, and thus force the drive bar into cooperative relationship with the pin 28. The camming action is achieved by the parallel members and the unique open U-shaped configuration of the respective sides of each member. The cooperative relationship of this cam shape with the drive bar automatically guides and achieves engagement of the pin with one of the respective slots thereof when the hubcap is positioned onto the wheel.

The pin 28, as best seen in FIG. 5 has an enlarged head 28a, a large diameter shank 28b, and a reduced diameter shank 28c engaging through a hole in the cap 30 with the end 28d peened over to hold the pin into a firm set non-moving relationship to the cap 30. As an important provision of this construction, however, a sleeve 28e slidably engages the large diameter shank 28b so as to have a limited slidable axial movement in the direction of the double ended arrow 50. The physical engagement of the pin 28 with the drive bar 22 is onto the sleeve 28e as it is held in spring biased relationship between the respective tang 32b or 34b, and the opposite side of the particular slot of drive bar 22. Therefore, it should be understood that since the sleeve 28e does have a limited axially slidable relationship, the firmly engaged relationship of pin 28 with respect to drive bar 22 is capable of axial or longitudinal sliding movement without creating any backlash problems. Hence, this movement in conjunction with the radial movement in the slots 32 and 34 substantially fully eliminates binding created by misalignment and prevents any undesirable side load or torque to the transducer driveshaft 20.

Therefore, in accordance with the objects of the invention, a novel cam positioned drive connector is provided which has no backlash, but which allows relative movement between the drive pin and drive bar in both the longitudinal and radial direction so that undesirable side loads or misalignment are compensated for to eliminate bearing wear problems within the driveshaft or rotor. The shape of the cam allows the hubcap to be simply pushed directly into position without having to even consider the position of the drive bar since the cam will direct the bar down between its two parallel side open U-shaped members and thereby engage the pin with the respective slot.

While in accordance with the Patent Statutes only the best known embodiment of the invention has been illustrated and described in detail, it is to be particularly understood that the invention is not limited thereto or thereby, but that the inventive scope is defined in the appended claims.

What is claimed is:

1. A cam positioned drive connector between a rotating body and a rotor comprising a cap removably mounted to the rotating body, a drive pin carried by the cap so as to be radially spaced from the center of rotation of the rotating body, and a drive bar connected to the rotor and adapted to cooperate with the drive pin which is characterized by cam means carried by the cap to guide the drive bar into cooperative relation with the pin when the cap is positioned onto the rotating body, said cam means having two spaced parallel diverging U-shaped members with the closed end of the U directed from the cap inwardly toward the drive bar, and with the pin located between the cams and adjacent one end thereof.

2. A connector as set forth in claim 1 which includes means to hold the pin in a biased firmly engaged relation without backlash to the drive bar.

3. A connector according to claim 2 which includes means to allow for controlled axial movement between the pin and the drive bar while maintaining the biased engagement therebetween.

4. A connector according to claim 3 which includes means to allow for a controlled radial movement between the pin and the drive bar while maintaining the biased engagement therebetween.

5. A connector according to claim 4 where said means to allow for controlled axial movement is a sleeve slidably engaging the pin between the pin and the drive bar, and said means to allow for controlled radial movement is a radially directed slot in said drive bar, and where said means to hold the pin in bias to the bar is a separation in the bar near one end of the slot so one longitudinal side of the bar defining the slot is a spring loaded tang whose end engages the pin upon stabbing of the pin into the slot.

6. A connector according to claim 5 where the drive bar is a long rectangular bar connected at its midpoint to the rotor, and where identical spring biased tangs are formed at both ends of the bar.

7. A cam positioned drive connector between a rotating body and a rotor comprising a cap removably mounted to the rotating body, a drive pin carried by the cap so as to be radially spaced from the center of rotation of the rotating body, and a drive bar connected to the rotor having a radially directed slot and adapted to cooperate with the drive pin which is characterized by means to hold the pin in a biased firmly engaged relation without backlash to the drive bar while allowing axial and radial relative movement therebetween while maintaining the biased engagement therebetween, said biased means having a separation in the bar near one end of the slot so one longitudinal side of the bar defining the slot is a spring loaded tang whose end engages the pin upon stabbing of the pin into the slot.

* * * * *